US011239965B2

(12) United States Patent
Song et al.

(10) Patent No.: US 11,239,965 B2
(45) Date of Patent: Feb. 1, 2022

(54) METHOD FOR MAPPING REFERENCE SIGNAL TO PHYSICAL RESOURCE IN WIRELESS COMMUNICATION SYSTEM AND APPARATUS THEREFOR

(71) Applicant: LG ELECTRONICS INC., Seoul (KR)

(72) Inventors: Huayue Song, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 122 days.

(21) Appl. No.: 16/623,356

(22) PCT Filed: Jun. 15, 2018

(86) PCT No.: PCT/KR2018/006802
§ 371 (c)(1),
(2) Date: Dec. 16, 2019

(87) PCT Pub. No.: WO2018/231017
PCT Pub. Date: Dec. 20, 2018

(65) Prior Publication Data
US 2020/0177334 A1 Jun. 4, 2020

Related U.S. Application Data

(60) Provisional application No. 62/519,885, filed on Jun. 15, 2017.

(51) Int. Cl.
H04W 4/00 (2018.01)
H04L 5/00 (2006.01)
H04W 72/04 (2009.01)

(52) U.S. Cl.
CPC ........... H04L 5/0048 (2013.01); H04W 72/04 (2013.01)

(58) Field of Classification Search
CPC .............................. H04L 5/0048; H04W 72/04
(Continued)

(56) References Cited

U.S. PATENT DOCUMENTS

2009/0080569 A1  3/2009 Han et al.
2009/0238064 A1* 9/2009 Lee ..................... H04L 25/0226
                                                        370/208
(Continued)

FOREIGN PATENT DOCUMENTS

WO      2016163738      10/2016

OTHER PUBLICATIONS

PCT International Application No. PCT/KR2018/006802, International Search Report dated Sep. 14, 2018, 4 pages.

Primary Examiner — Maharishi V Khirodhar
(74) Attorney, Agent, or Firm — Lee Hong Degerman Kang Waimey

(57) ABSTRACT

The present disclosure provides a method for mapping a reference signal (RS) sequence to a physical resource in a wireless communication system. Specifically, the method performed by a terminal comprises the steps of: receiving, from a network, length information indicating a length of the RS sequence and offset information indicating a start position of the RS sequence mapped to the physical resource allocated to the terminal; generating the RS sequence on the basis of the received length information; and mapping the generated RS sequence to the physical resource on the basis of the offset information.

9 Claims, 13 Drawing Sheets

(58) Field of Classification Search
USPC .......................................................... 370/329
See application file for complete search history.

(56) References Cited

U.S. PATENT DOCUMENTS

| | | |
|---|---|---|
| 2010/0284265 A1 | 11/2010 | Ogawa et al. |
| 2014/0241284 A1* | 8/2014 | Zhou ..................... H04B 7/024 |
| | | 370/329 |
| 2014/0293943 A1 | 10/2014 | Yoon |
| 2018/0343089 A1* | 11/2018 | Park ........................ H04L 5/005 |
| 2019/0044601 A1* | 2/2019 | Chang .................. H04L 5/0092 |
| 2020/0045650 A1* | 2/2020 | Suzuki ................. H04W 76/11 |

* cited by examiner

FIG. 5
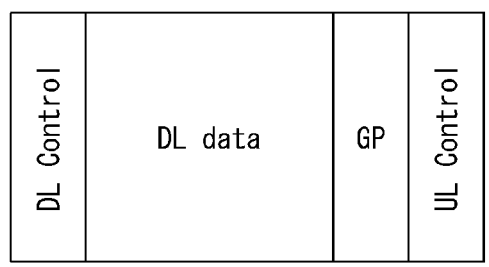
(a)
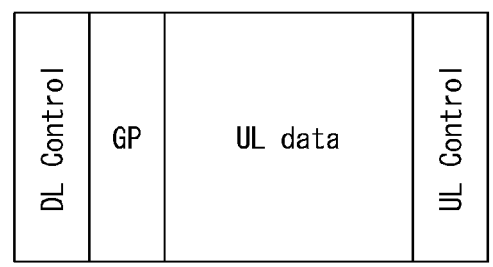
(b)
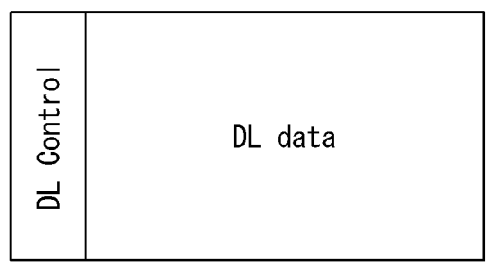
(c)
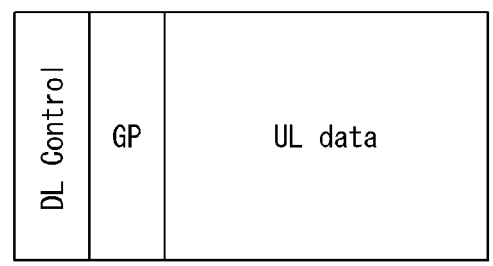
(d)

METHOD FOR MAPPING REFERENCE SIGNAL TO PHYSICAL RESOURCE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/006802, filed on Jun. 15, 2018, which claims the benefit of U.S. Provisional Application No. 62/519,885, filed on Jun. 15, 2017, the contents of which are all hereby incorporated by reference herein in their entirety.

TECHNICAL FIELD

The present disclosure relates to a wireless communication system, and more particularly, to a method for mapping a reference signal (RS) to a physical resource and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure has been made in an effort to provide a method which may use a common RS sequence to terminals having various bandwidth (BW) sizes and various BW locations in a wideband system.

Furthermore, the present disclosure has been made in an effort to provide a method for configuring the length of an RS sequence based on BWs of terminals accessing a network.

Furthermore, the present disclosure has been made in an effort to provide a specific method for mapping the RS sequence to a corresponding physical resource by comparing a system BW and a physical resource allocated to the terminal.

The technical objects of the present disclosure are not limited to the aforementioned technical objects, and other technical objects, which are not mentioned above, will be apparently appreciated by a person having ordinary skill in the art from the following description.

Technical Solution

The present disclosure provides a method for mapping a reference signal (RS) sequence to a physical resource in a wireless communication system.

Specifically, the method performed by a terminal includes: receiving, from a network, length information indicating a length of the RS sequence and offset information indicating a start position of the RS sequence mapped to the physical resource allocated to the terminal; generating the RS sequence based on the received length information; and mapping the generated RS sequence to the physical resource based on the offset information, in which the generated RS sequence is mapped to the physical resource from a position corresponding to a value indicated by the offset information.

Furthermore, in the present disclosure, the length information is transmitted through a common resource or a common group resource.

Furthermore, in the present disclosure, the physical resource allocated to the terminal is a bandwidth (BW) or a bandwidth part (BWP).

Furthermore, in the present disclosure, when the length of the generated RS sequence is smaller than the size of the physical resource allocated to the terminal, the generated RS sequence is repeated at least once and mapped to the physical resource.

Furthermore, in the present disclosure, when the generated RS sequence is repeated at least once, different scramblings are applied among the RS sequences.

Furthermore, in the present disclosure, the method further includes receiving, from the network, a scrambling identifier (ID) for identifying the scramblings applied to the RS sequences, respectively.

Furthermore, in the present disclosure, when the length of the generated RS sequence is larger than the size of the physical resource allocated to the terminal, only some of the generated RS sequences are mapped to the physical resource.

Furthermore, in the present disclosure, the length of the RS sequence is configured based on the bandwidth (BW) of at least one terminal connected to the network.

Furthermore, in the present disclosure, the length of the RS sequence is configured based on a largest bandwidth or a smallest bandwidth in the bandwidth of at least one terminal connected to the network.

Furthermore, the present disclosure provides a terminal for mapping a reference signal (RS) sequence to a physical resource in a wireless communication system, including: a radio frequency (RF) module transmitting and receiving a radio signal; and a processor functionally connected with the RF module, in which the processor controls to receive, from a network, length information indicating a length of the RS sequence and offset information indicating a start position of the RS sequence mapped to the physical resource allocated to the terminal, generate the RS sequence based on the received length information, and map the generated RS sequence to the physical resource based on the offset information, and the generated RS sequence is mapped to the physical resource from a position corresponding to a value indicated by the offset information.

Advantageous Effects

According to the present disclosure, there is an effect of efficiently using resources by providing an RS sequence length and an RS sequence offset so as to use a common RS to terminals having various BW sizes and BW locations.

Furthermore, according to the present disclosure, there is an effect of reducing signaling overhead by transmitting information on a common RS sequence to terminals using common resources or group common resources.

Effects obtainable in the present disclosure are not limited to the aforementioned effects and other unmentioned effects will be clearly understood by those skilled in the art from the following description.

DESCRIPTION OF DRAWINGS

The accompanying drawings, which are included as part of the detailed description in order to help understand the present disclosure, provide embodiments of the present disclosure and describe the technical features of the present disclosure together with the description.

FIG. 5 illustrates examples of a self-contained subframe structure to which the method proposed in the present disclosure may be applied.

MODE FOR INVENTION

Figure 1:
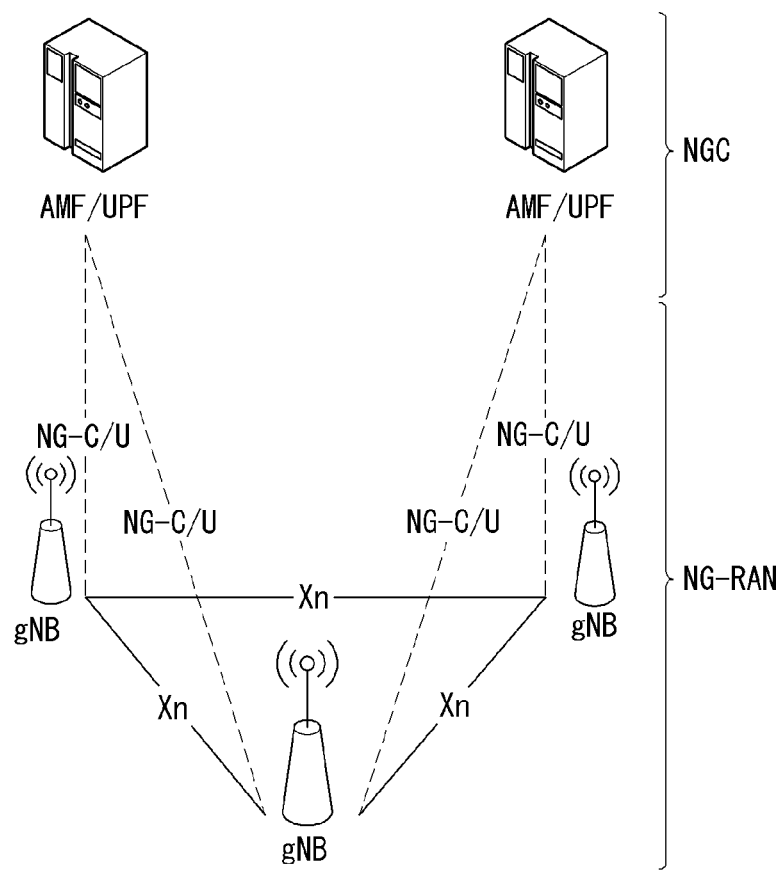
FIG. 1 is a diagram illustrating an example of an overall system structure of NR to which a method proposed in the present disclosure may be applied.

In what follows, preferred embodiments of the present disclosure will be described in detail with reference to appended drawings. Detailed descriptions to be disclosed below with reference to the appended drawings are intended to describe illustrative embodiments of the present disclosure but are not intended to represent the sole embodiment of the present disclosure. Detailed descriptions below include specific details to provide complete understanding of the present disclosure. However, it should be understood by those skilled in the art that the present disclosure may be embodied without the specific details to be introduced.

In some cases, to avoid obscuring the gist of the present disclosure, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The embodiments of the present disclosure may be supported by standard documents disclosed for at least one of wireless access systems such as the IEEE 802, 3GPP, and 3GPP2. In other words, those steps or portions among embodiments of the present disclosure not described to clearly illustrate the technical principles of the present disclosure may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present disclosure are not limited to the specific system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$ In this case, $\Delta f_{max}=480 \cdot 10^3$ and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
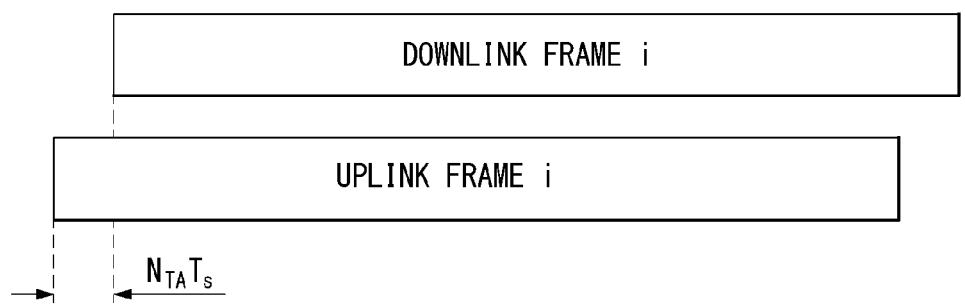
FIG. 2 illustrates a relationship between an uplink frame and a downlink frame in a wireless communication system to which the method proposed in the present disclosure may be applied.

FIG. 2 illustrates a relationship between a UL frame and a DL frame in a wireless communication system to which a method proposed by the present disclosure may be implemented.

As illustrated in FIG. 2, an UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^{\mu} \in \{0, \ldots, N_{subframe}^{slots,\mu}-1\}$ in a subframe, and in ascending order of $n_{s,f}^{\mu} \in \{0, \ldots, N_{subframe}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu} N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
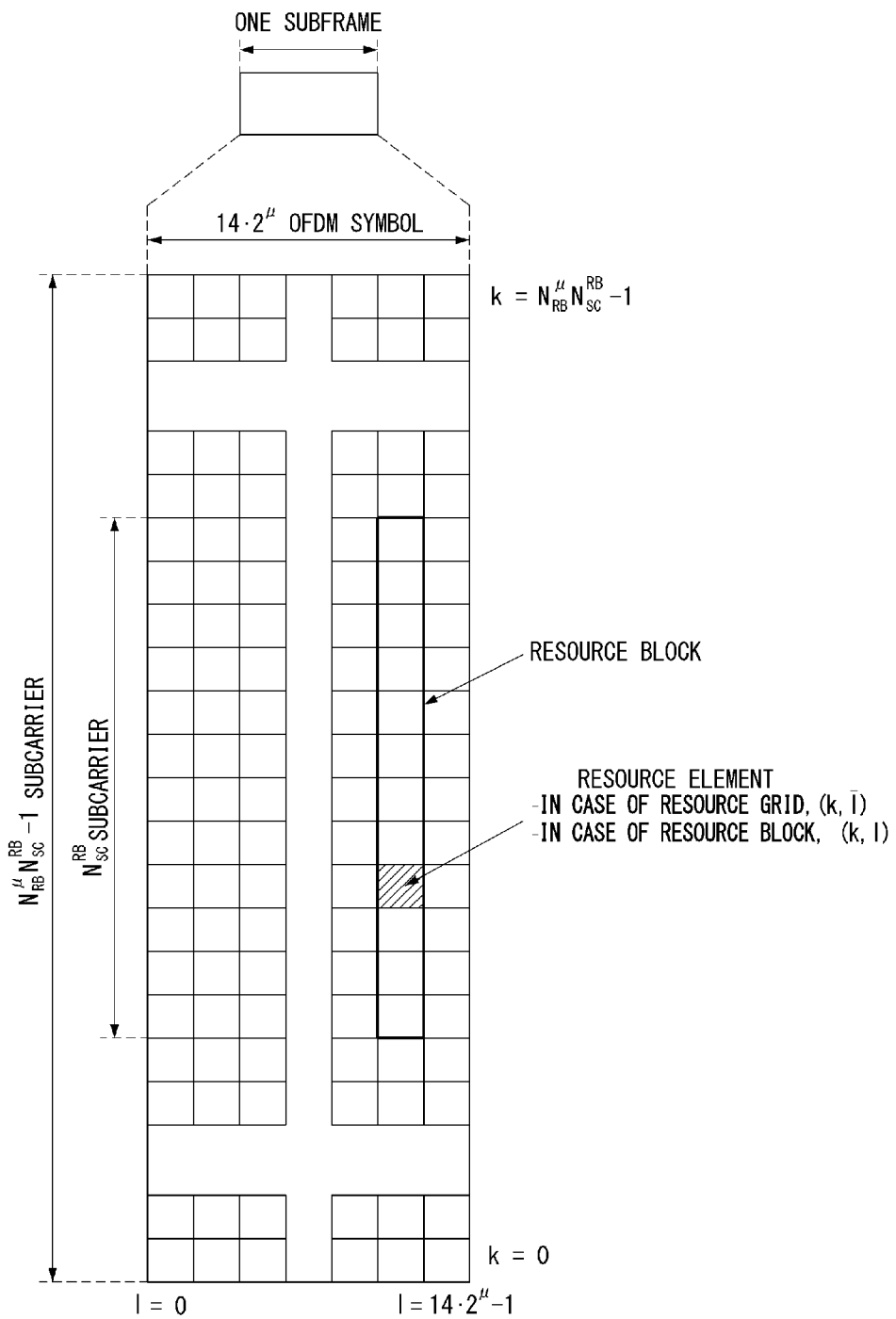
FIG. 3 illustrates an example of a resource grid supported in the wireless communication system to which the method proposed in the present disclosure may be applied.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 4:
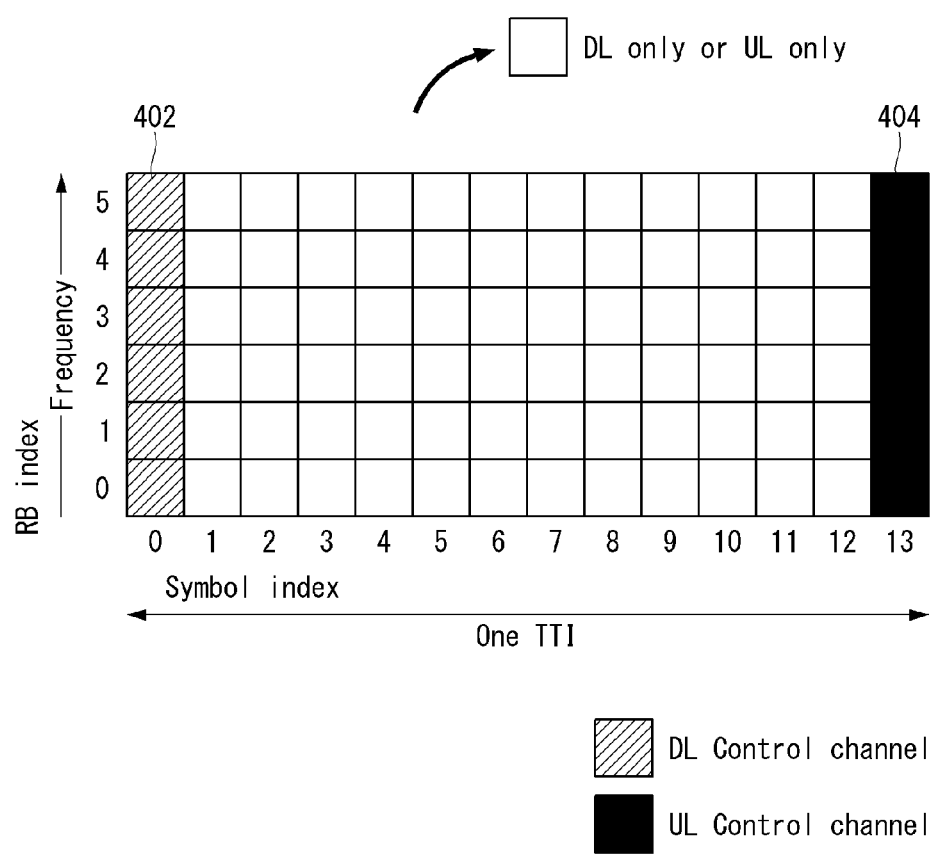
FIG. 4 illustrates an example of a self-contained subframe structure to which the method proposed in the present disclosure may be applied.

In this case, as illustrated in FIG. 4, one resource grid may be configured for the numerology μ and an antenna port p.

FIG. 4 shows examples of resource ports of an antenna port and a ringer by which the method proposed in the present disclosure can be applied.

Each element of the resource grid for the numerology μ and the antenna port p is indicated as a resource element, and may be uniquely identified by an index pair (k, Ī) Herein, k=0, ..., $N_{RB}^{\mu}N_{sc}^{RB}$−1 is an index in the frequency domain, and Ī=0, ..., $2^{\mu} N_{symb}^{(\mu)}$−1 indicates a location of a symbol in a subframe. To indicate a resource element in a slot, the index pair (k, l) is used. Herein, l=0, ..., $N_{symb}^{\mu}$−1.

The resource element (k, Ī) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}$=12 continuous subcarriers in the frequency domain. In the frequency domain, physical resource blocks may be numbered from 0 to $N_{RB}^{\mu}$−1. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 $N_{RB}^{\mu}$−1 in the frequency region.

Self-Contained Subframe Structure

A time division duplexing (TDD) structure taken into consideration in the NR system is a structure in which both the uplink (UL) and the downlink (DL) are process in one subframe. This is for minimizing latency of data transmission in the TDD system. The structure is called a self-contained subframe structure.

FIG. 4 shows an example of a self-contained subframe structure to which a method proposed in the present disclosure may be applied. FIG. 2 is merely for convenience of description, and does not restrict the scope of the present disclosure.

Referring to FIG. 4, as in the case of legacy LTE, a case where one subframe is configured with 14 orthogonal frequency division multiplexing (OFDM) symbols is assumed.

In FIG. 4, a region 402 means a DL control region, and a region 404 means an UL control region. Furthermore, a region (i.e., region not having separate indication) except the region 402 and the region 404 may be used for the transmission of DL data or UL data.

That is, UL control information and DL control information are transmitted in a single self-contained subframe. In contrast, in the case of data, UL data or DL data are transmitted in a single self-contained subframe.

If the structure shown in FIG. 4 is used, downlink transmission and uplink transmission may be sequentially performed and the transmission of DL data and the reception of uplink ACK/NACK may be performed within a single self-contained subframe.

As a result, if an error of data transmission occurs, the time taken for the retransmission of data may be reduced. Accordingly, latency related to data forwarding can be minimized.

In a self-contained subframe structure, such as FIG. 4, there is a need for a time gap for a process for an eNodeB (eNB or gNB) and/or a terminal (or user equipment (UE)) to switch from a transmission mode to a reception mode or a process for an eNB and/or a UE to switch from the reception mode to the transmission mode. In relation to the time gap, if uplink transmission is performed after downlink transmission in the self-contained subframe, some OFDM symbol(s) may be configured as a guard period (GP).

Furthermore, in the NR system, various types of self contained subframe structures may be taken into consideration in addition to the structure shown in FIG. 4.

FIG. 5 shows examples of a self-contained subframe structure to which a method proposed in the present disclosure may be applied. FIG. 3 is merely for convenience of description, and does not restrict the scope of the present disclosure.

As in (a) to (d) of FIG. 5, a self-contained subframe in the NR system may be configured with various combinations using a DL control region, a DL data region, a guard period (GP), an UL control region, and/or an UL data region as one unit.

Hereinafter, a method for determining (or selecting) an RS sequence length and a scrambling sequence in a network so that the corresponding UEs use a common reference signal (RS) and a method for mapping the determined RS sequence by each UE, when UEs having various bandwidth (BW) sizes and various BW locations are present in a wideband system proposed in the present disclosure, will be described.

A new radio (NR) system supports UEs supporting various BWs.

In addition, from the point of view of the network, maintaining flexibility in scheduling all UEs is one of goals of the NR.

That is, the network supports flexibly signaling of the BW sizes (UE supportable BW) and the BW locations of the UEs in order to optimize transmission and reception environments of all of the UEs.

Therefore, although much signaling may be performed in a UE-specific scheme for such a purpose, it may be efficient for the UEs to share information common to all UEs.

Here, the common RS may be one of the common information.

Therefore, the present disclosure proposes an RS sequence length configuring method, a scrambling sequence configuring method, and an RS mapping mechanism for efficient RS use in the aforementioned environment.

That is, the present disclosure specifies a method in which the UE uses the common information (e.g., common RS) to be UE-specific.

First, a method for configuring (setting) the RS sequence length and a method for scrambling the RS sequence length are described.

When the RS is generated for the UEs in the NR system, the network may determine states of UEs currently accessing the network and flexibly configure the RS sequence length.

Here, various RS sequence lengths are predefined and the network may announce to the UEs a defined number of the corresponding RS sequence length or the network may directly announce to the UEs information on the corresponding RS sequence length.

When the network determines (or selects) the RS sequence flexibly, three criteria may be applied as shown in Option 1 to Option 3 below.

First, Option 1 is a method for configuring the RS sequence length based on a largest BW among the UEs accessing the network or to a largest BW value among BW values supported by the UEs sharing the RS sequence.

Next, Option 2 may configure the RS sequence length based on a narrow BW or based on a subband among the UEs accessing the network.

In this case, wideband UEs may use a method of configuring the same RS sequence to be repeatedly used or concatenating RSs configured in the subband.

Next, Option 3 is a method for configuring various RS sequence lengths in one NR system.

For example, when the aforementioned RS sequence is generated based on a PN sequence, a method of Equation 2 below may be used.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 2]

$$m = 0, 1, \ldots, 2N_{RB}^{max,DL} - 1$$

Here, $N_{RB}^{max,DL}$ may not be a predetermined value and may be a value which the network may flexibly change by determining accessing states of the UEs or a value which the network may signal regardless of a system bandwidth.

Since Option 1 and Option 2 described above use the same value ($N_{RB}^{max,DL}$) in the NR system, the $N_{RB}^{max,DL}$ may be transferred to the UEs by using common resources (e.g., physical broadcast channel (PBCH), remaining minimum system information (RMSI), and UE-group signaling). However, the corresponding information may be signaled to be UE-specific.

In Option 3, since the RS sequence may be generated with various lengths in each frequency range, RS sequence length information is transferred to the UEs by using UE-specific or group common resources (Msg4, radio resource control (RRC), and UE specific search space (USS)).

Further, the RS sequence length information may be transmitted to multiple UEs through UE-group signaling.

Each UE may generate the same reference sequence by detecting $N_{RB}^{max,DL}$ information in a corresponding resource.

However, each UE maps the RS sequence to the BW thereof after a predetermined offset, not the beginning of the reference sequence, according to the frequency range of the configured BW and the location of the BW.

An RS mapping method in each UE, in particular, a method for mapping the RS sequence based on an RS index offset will be described below.

When there are multiple UEs supporting a wide BW among the UEs accessing the network and there are a minority of UEs supporting a narrow BW the network may configure the RS sequence length based on a UE supporting a largest BW, or when the system BW is divided into multiple subbands, the network may configure the RS sequence length based on the subband.

Figure 6:
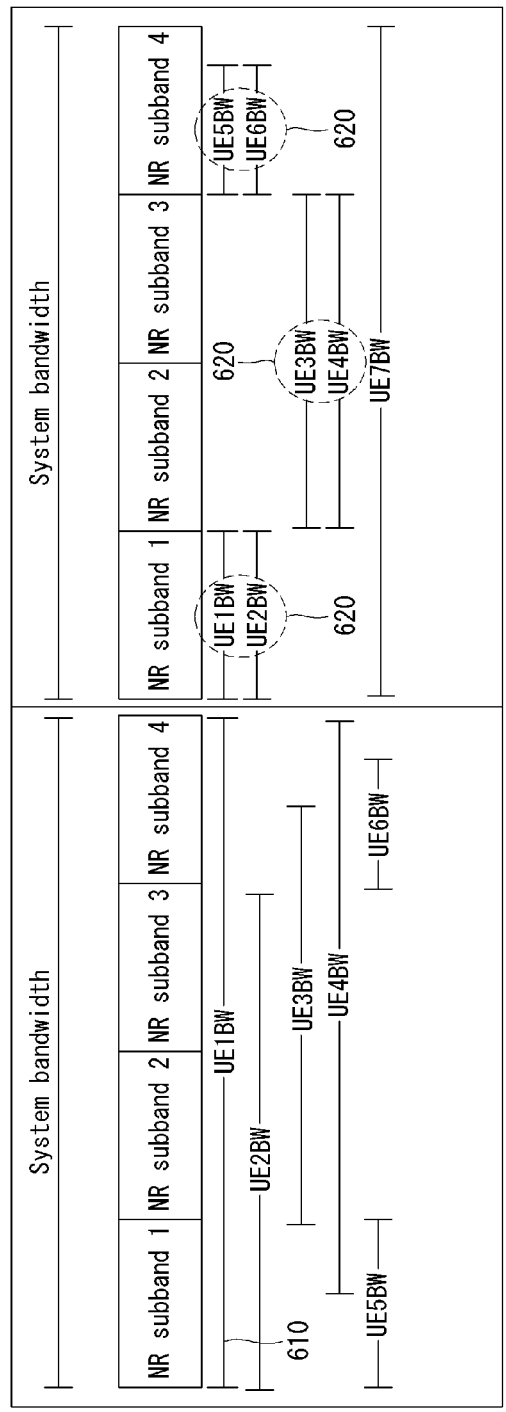
FIGS. 6a and 6b are diagrams illustrating an example of a method for configuring an RS sequence length proposed by the present disclosure.

FIGS. 6a and 6b are diagrams illustrating an example of a method for configuring an RS sequence length proposed by the present disclosure.

Referring to FIG. 6a, the RS sequence may be generated based on UE 1 BW (based on largest BW) 610 or based on an NR subband.

In this case, the network may announce to the UEs length information of the generated sequence by using the common resource.

Alternatively, as illustrated in FIG. 6b, when the BWs of the UEs accessing the network have various narrow bands and UEs 620 having narrows bands having the same size are allocated to the same location, the network may configure various RS sequence lengths.

That is, referring to FIG. 6b, when the network does not transmit separate RS sequence length information to the narrow band UEs, each UE generates and uses an RS sequence suitable for the BW thereof, and as a result, common signaling information transmitted by the network may be reduced.

However, since the network should inform the wideband UE of the RS sequence length for each part of the BW, UE-specific signaling may increase.

In addition to the aforementioned method, a method for generating the RS sequence may be variously defined as follows.

When multi user-multiple input multiple output (MU-MIMO) is performed for a wideband UE and a narrow band UE in the NR system, in the case of using frequency division multiplexing (FDM), the network may generate the RS sequence according to the bandwidth of each UE.

Alternatively, when code division multiplexing (CDM) is used, the network configures the RS sequence based on the wideband UE, and the narrowband UE may use some of the RS sequences like Option 1 described above.

In this case, the operation of the UE may be defined as follows.

When the UE knows the system bandwidth, if the length and/or RS index offset for the RS sequence generation is not configured, the UE may generate the RS sequence according to the system bandwidth.

When the UE does not know the system bandwidth, if the length and/or RS index offset for the RS sequence generation is not configured, the UE may locally generate the RS sequence according to an area to which the bandwidth part (BWP) or data assigned thereto or a control resource set (CORESET) Physical Resource Block (PRB) list.

That is, the UE generates the RS sequence by default according to the system bandwidth or a local bandwidth part (or data/control region) and when the length and/or the RS index offset for the RS sequence are given, the UE follows the corresponding parameters.

Here, the RS index offset may refer to information indicating from which point of the generated RS sequence the UE maps the RS sequence.

The RS index offset may be interpreted as an offset with a center or edge (e.g., lowest PRB or highest PRB) of a BW configured for a specific UE.

The RS index offset may mean a difference between a start point of the RS sequence and a start point where the UE actually maps the RS sequence to the physical resource.

When the network configures the RS index offset to the UE in units of resource block (RB), the corresponding UE may calculate a value to be actually applied according to the number of RS subcarriers present in one RB or the network directly may configure the RS index offset to the corresponding UE in units of subcarrier and the corresponding UE may directly apply a configured value.

In addition, the reason why the RS index offset is required is that when the common RS sequence is applied to various UEs, each UE needs to be indicated which part of the RS sequence a part which each UE is to use is.

The indication may be expressed as the RS index offset.

In the aforementioned RS parameters may be divided into (1) a case where a single set of the RS sequence length/RS index offset is configured and (2) a case where the RS sequence length/RS index offset is given for each bandwidth part (BWP).

First, in the case where the single set of the RS sequence length/RS index offset is configured, it is assumed that the RS sequence covers or includes the bandwidth part.

A process in which the single set is configured as large as the length of the RS sequence and then the corresponding RS sequence is mapped may follow two following cases.

Case where the UE knows the system bandwidth (or case where the UE knows the center):

The RS sequence is mapped from the center of the carrier or the lowest PRB. In this case, RS index offset information may not be required.

Case where the UE does not know the system bandwidth (or case where the UE does not know the center):

PRB indexing is performed based on the center of an accessed synchronization signal (SS) block (SSB) and the length of the RS sequence and the RS index offset are applied to map the RS sequence.

In this case, the RS index offset may be defined as a difference between the SS block and the center.

When multiple SS blocks are present in one NR carrier, an RS index offset may be present for each SS block.

Next, when the RS sequence length and the RS index offset are given for each bandwidth part, a process of mapping the corresponding RS sequence may follow two following cases.

The PRB indexing may be performed based on the lowest PRB or the center for each bandwidth part, and the RS sequence may be mapped from "offset+1" to the lowest PRB using the RS sequence length and the RS index offset or "offset" may be mapped to the center.

When multiple bandwidth parts are overlapped, the RS sequence length may be similarly given and offset information may be given for each bandwidth part.

Alternatively, when the centers or lowest PRBs of multiple bandwidth parts coincide with each other, the offset information may also be similarly given.

Alternatively, the RS sequence is configured based on the narrow band UE to allow the wideband UE to repeatedly use the corresponding sequence. A specific method of repeatedly using the RS sequence will be described below.

Next, methods (e.g., method 1 and method 2) of mapping the RS sequence for different UEs will be described.

In the present disclosure, it may be interpreted that a downlink-related RS sequence may be generated by the network and transmitted to the UE and an uplink-related RS sequence is generated by the UE and transmitted to the network.

(Method 1)

Method 1 is a method of mapping RSs for different UEs using a base sequence length and a starting index.

The starting index may be interpreted as the same mean as the RS index offset.

The UEs having various BWs may access the network through an initial access and then receive RS sequence length information and RS index offset information for RS mapping from the network.

Since one UE may map the beginning or a predetermined middle point of the RS sequence generated by the network, the network may indicate to the corresponding UE an (RS sequence mapping) starting point of the UE as the RS index offset information.

Alternatively, the network may transmit to the UEs information (or indication) on a part to be punctured between the base RS sequence length and the corresponding RS sequence.

As one example, the length of the RS sequence generated by the network is assumed as 2*N.

In this case, when K puncturing is available from the first, the UE may map K+1 of the RS sequence to a first RE of the RS mapped a first PRB in the configured bandwidth.

That is, this may be a scheme of announcing the starting points of a base sequence and a partial sequence to be brought and used in the base sequence.

Figure 7:
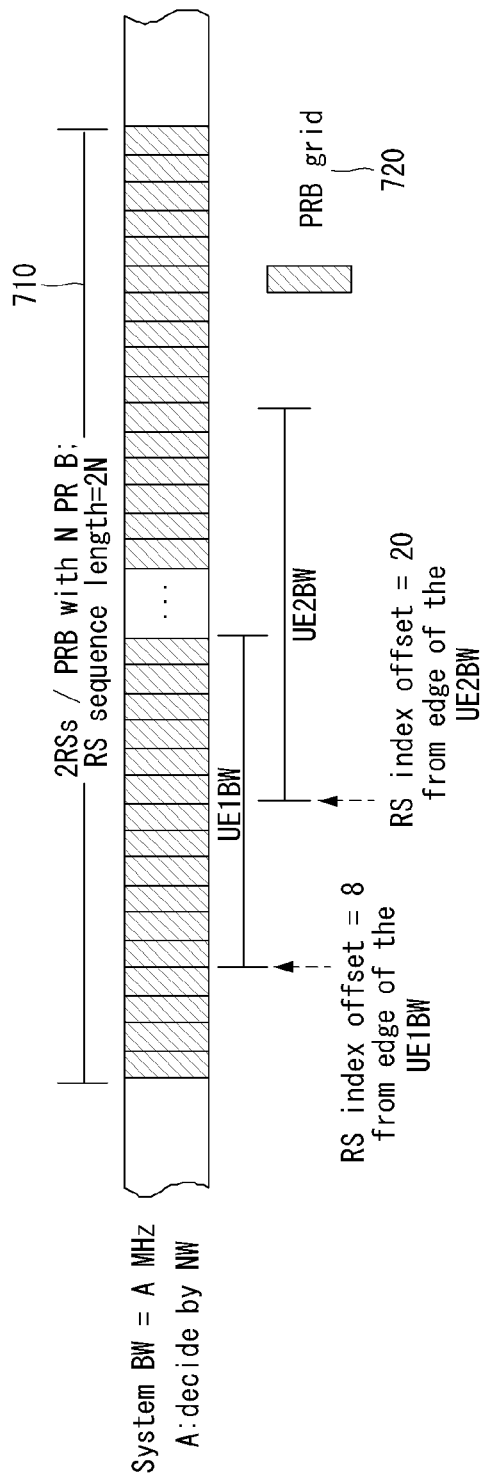
FIG. 7 is a diagram illustrating an example of an RS sequence mapping method proposed in the present disclosure.

FIG. 7 is a diagram illustrating an example of an RS sequence mapping method proposed in the present disclosure.

Specifically, FIG. 7 illustrates an example of Method 1 described above.

In FIG. 7, the system BW supported by the network is A MHz and the A value is determined by the network. In addition, in FIG. 7, a hatched portion 710 represents a total of N PRBs and one unit 720 of the hatched portion represents one PRB (grid), and two RSs per PRB are present.

Referring to FIG. 7, the UE receives RS sequence length information (e.g., Length=2N) and the RS index offset from the network in the BW configured for the UE.

When the RS index offset is configured based on the edge of UE 1 BW, the RS index offset value may be 8 (4PRB*2RSs) and when the RS index offset is configured based on the edge of UE 2 BW, the RS index offset value may be 20 (10PRB*2RSs).

As mentioned above, a criterion for determining the RS index offset may be various methods (e.g., an edge criterion of the BW configured for the UE, a center criterion of the BW configured for the UE, and a center criterion of the SS block).

In this case, by which criterion the RS index offset is to be configured may be determined by default or determined by the network and transmitted to the UE.

The RS index offset information may be transmitted to the UE through a resource configured in units of UE-specific search space (USS) or group.

Multiple UEs may be configured with various BWs, but when physical start points of the configured BWs are the same as each other, the network transmits to the corresponding group the RS index offset value through the group common resource to reduce signaling overhead.

When the UEs having various BWs access a network having multiple SS blocks from different SS blocks, respectively, a set of the RS sequence length information and the RS index offset information based on each SS block may be configured to the UEs.

That is, when the BW of the shared RS includes the corresponding SS blocks, the offset between the center of the SS block and the center of the RS BW or the offset between the SS blocks and the lowest PRB of the RS BW may be commonly indicated to the accessing UEs.

Figure 8:
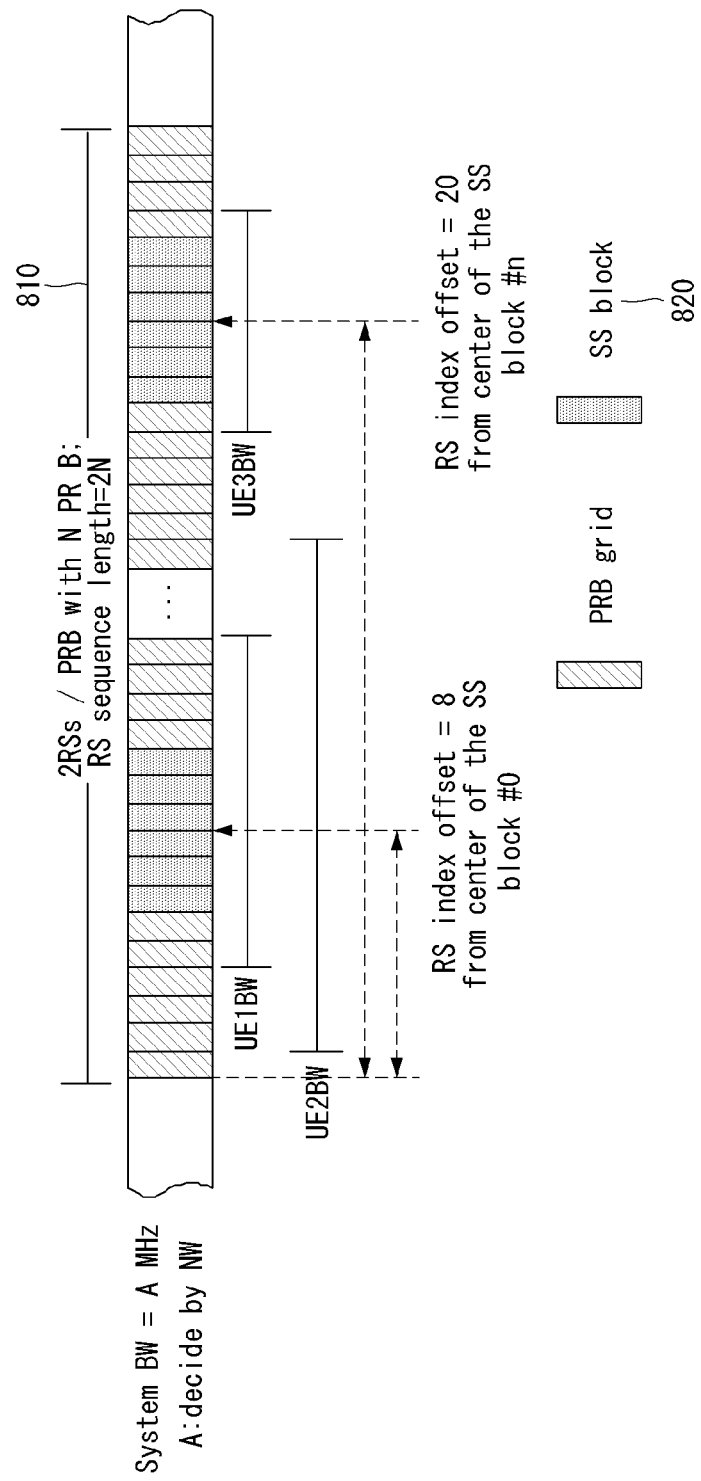
FIG. 8 is a diagram illustrating another example of an RS sequence mapping method proposed in the present disclosure.

FIG. 8 is a diagram illustrating another example of an RS sequence mapping method proposed in the present disclosure.

In FIG. 8, the system BW supported by the network is A MHz and the A value is determined by the network. In addition, in FIG. 8, a hatched portion 810 represents a total of N PRBs and one unit of the hatched portion represents one PRB (grid), and two RSs per PRB are present.

Referring to FIG. 8, the UE receives RS sequence length information (e.g., Length=2N) and the RS index offset from the network in the BW configured for the UE.

Referring to FIG. 8, it can be seen that multiple (p) SS blocks are present in the system BW (or network) and the BWs of the UEs accessing from each SS block are diversified.

The p is a natural number larger than 1.

UE 1 and UE 2 access the network from SS block (SSB) #0 and UE 3 accesses the network from SS block (SSB) #n.

In this case, the network may announce to the UEs information which is {RS length=2N, RS index offset=18 (9PRB*2RS)} by using the common resource in SS block #0.

In addition, UE 1 and UE 2 receive corresponding information and calculate the RS index offset of mapping the RS to each BW to use the shared RS.

In addition, the network may announce to the UEs information which is {RS length=2N, RS index offset=Mn} in SS block #n.

Here, UE 3 may calculate the RS index offset for mapping the RS sequence to the BW thereof by using the corresponding RS index offset information.

(Method 2)

Method 2 is a method for mapping the RS sequence for different UEs by using the (RS) base sequence length and parameters related to repetition/spreading.

Here, Method 2 may be applied when the base sequence length is smaller than the bandwidth part (BWP) of the UE.

That is, when the base sequence length is smaller than the bandwidth part (BWP), the UE may repeatedly map the base sequence.

When the base sequence is repeatedly mapped, scrambling or spreading may be applied to the base sequence.

Accordingly, the network may configure to the UE the corresponding parameters (scrambling or spreading related parameters) together with the base sequence length/offset.

Figure 9:
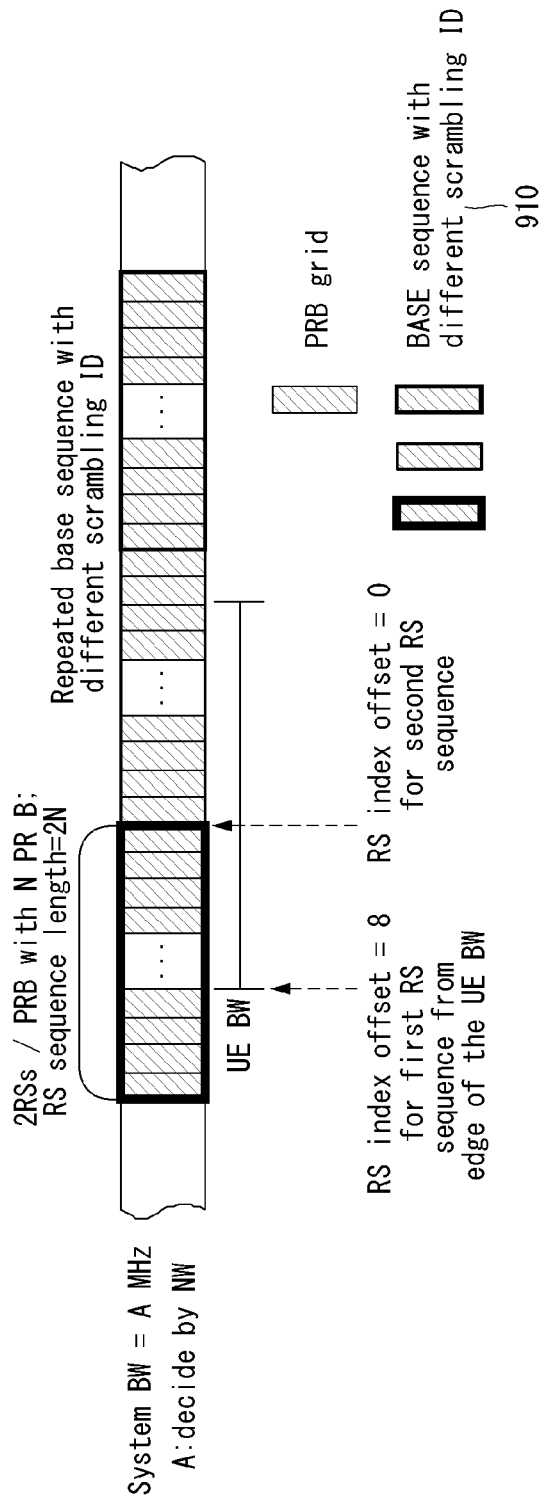
FIG. 9 is a diagram illustrating yet another example of an RS sequence mapping method proposed in the present disclosure.

This may be considered in a method of applying the base sequence to the wideband UE according to the narrowband UE, and FIG. 9 illustrates an example of such a method.

FIG. 9 is a diagram illustrating yet another example of an RS sequence mapping method proposed in the present disclosure.

If the bandwidth configured in one UE is larger than the bandwidth of the RS base sequence, the network may inform the corresponding UE of the start RS index offset of the first RS sequence used by the corresponding UE.

The UE uses the first RS sequence and maps the used first RS sequence to the bandwidth thereof, recognizes that the same base sequence is repeatedly mapped when there is not enough RS sequence to be mapped, and sequentially maps the beginning of a second RS sequence to the remaining bandwidth.

Here, the repeated RS base sequence may use a scrambling ID (or spreading factor) different from the first RS sequence.

The scrambling ID (or spreading factor) may be configured to the corresponding UE by the network in advance or announced to the corresponding UE through RRC signaling.

In FIG. 9, the system BW supported by the network is A MHz and the A value is determined by the network. In addition, in FIG. 9, a hatched portion represents a total of N PRBs and one unit of the hatched portion represents one PRB (grid), and two RSs per PRB are present.

In FIG. 9, the RS index offset value of the UE for the first RS sequence indicates 8 and the RX index offset value of the UE for the second RS sequence indicates 0.

In addition, different scrambling IDs 910 are applied to respective RS sequences.

For reference, a UE (e.g., Rel. 16) having a BW of 120 MHz may reuse an RS sequence in which the RS of UE 1 (e.g., Rel. 15) and the RS of UE 2 (e.g., Rel. 15) are combined.

The RS sequence defined in Rel. 15 is not a problem in applying to the UEs of Rel. 15, but when UEs supporting Rel. 16 or subsequent release support the larger BW, there may be some problems described below.

That is, when it is assumed that the BW of the Rel. 16 UE is larger than the maximum BW of the Rel. 15 UE, some problems may occur as follows.

1) When RS sequence generation is performed based on the Rel. 15 UE, a situation in which RS mapping is not performed in some regions of the Rel. 16 UE may occur.

2) There is a possibility that the Rel. 15 UE may not correctly decode the corresponding information during RS sequence generation based on the Rel. 16 UE. That is, when there is a difference in the number of bits of signaling, a situation in which the corresponding UE performs decoding to different values may occur.

3) When the network generates RS sequences separately based on each of the Rel. 15 UE and the Rel. 16 UE, the efficiency of using resources may be lowered.

In this case, there is a possibility that different RS resources will overlap and interfere with each other.

For the above reasons, the RS sequence mapping method described above may be used as RS sequence generation and RS sequence mapping methods which efficiently use the resource and minimize the signaling overhead for subsequent Release UEs while not affecting existing Release UEs.

More specifically, as a method for mapping the RS sequences for different UEs when the (RS) base sequence length generated by the network is smaller than the bandwidth part (BWP) of the UE, a method for concatenating several (RS) base sequences may be considered.

In this case, the length of each (RS) base sequence and generated related parameters may be differently configured.

Such a method has an advantage of reducing the signaling overhead when the BWs of the UEs having various bandwidths do not overlap with each other.

In other words, the network may not transfer separate RS sequence length information to the UEs by generating an RS sequence suitable for each UE bandwidth.

When there is no corresponding information, the UE may generate and use an RS sequence which coincides with the bandwidth configured to the UE.

A method for determining the length (DL maximum RB number) of the RS base sequence and the start position of the RS sequence to be used by the UE, i.e., the offset (RS index offset) from the (RS) base sequence may have various options as follows.

Option 1 is a method for determining one RS index offset value for each UE.

When the BWs of UEs accessing the network are diversified and the BWs overlap with each other, one RS index offset may be determined for each UE.

Option 2 is a method for determining one RS index offset value for each numerology/for each UE.

When the numerology is different, the RS index offset value may be determined according to a predetermined rule.

For example, when the RS sequence length and the RS index offset are determined based on a case where the subcarrier spacing is 30 kHz, in the case of using the 15 kHz subcarrier spacing in the same BW, the RS sequence may be spread or repetitively mapped and each RS index offset may be used in the form of the same index or the existing index*2.

Option 3 is a method for determining one RS index offset value for each bandwidth part.

Option 4 is a method for determining one RS index offset value for each RS sequence.

Option 5 is a method for determining one RS index offset value for each RS type.

The RS type may include various RS types including a PN sequence based RS and a CAZAC sequence based RS.

Hereinafter, cross-correlation performance using the same or different base sequences having different orthogonal cover codes (OCCs) will be described with reference to FIGS. 10 and 11.

Figure 10:
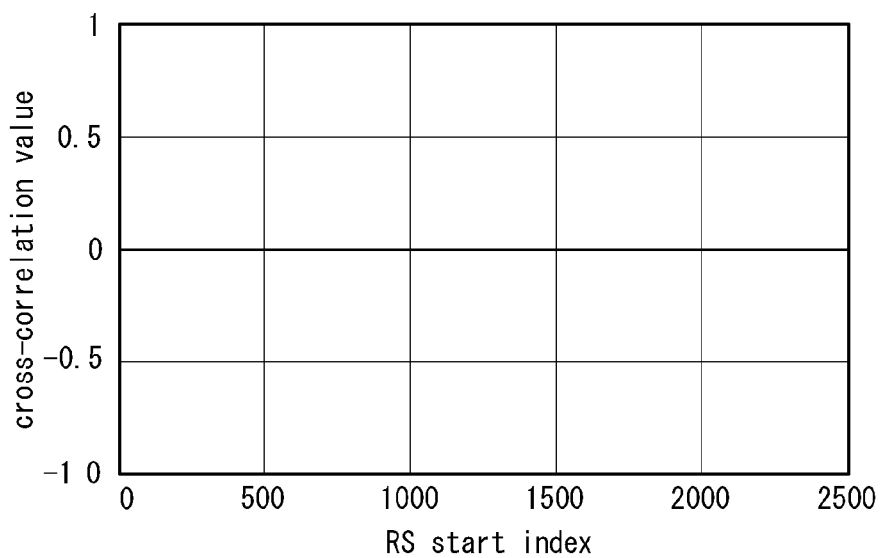
FIG. 10 illustrates an example illustrating cross-correlation performance using the same base sequences with different OCCs.
Figure 11:
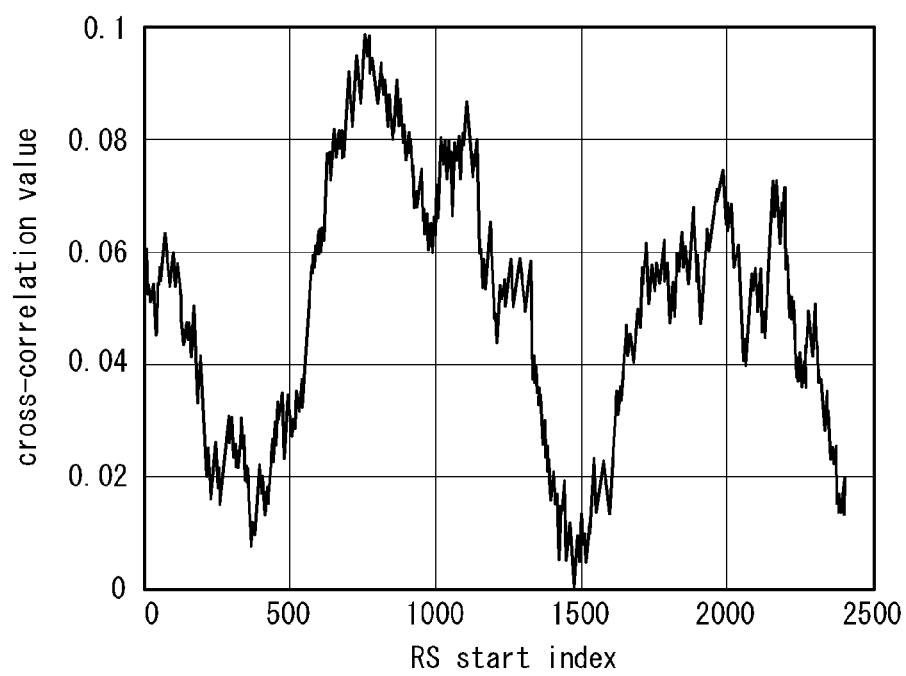
FIG. 11 illustrates an example illustrating cross-correlation performance using different base sequences with different OCCs.

FIG. 10 illustrates an example illustrating cross-correlation performance using the same base sequences with different OCCs and FIG. 11 illustrates an example illustrating cross-correlation performance using different base sequences with different OCCs.

That is, in FIGS. 10 and 11, in an MU-MIMO environment, the RS sequence is generated based on the wideband UE and when the narrow band UE uses a portion of the generated RS sequence, a cross-correlation value based on the narrow band UW is obtained.

Parameters used in performing a simulation are shown in Table 4 and both the wideband UE and the narrow band UE generate an RS sequence corresponding to 250 RB based on the wideband and add respective orthogonal cover codes (OCCs) to the generated RS sequence.

In addition, the narrow band UE uses a portion in a long sequence according to the BW location thereof and takes a cross-correlation with the RS sequence at the same location in the wideband.

The simulation of FIG. 10 and FIG. 11 is performed under an ideal channel environment, and FIG. 10 illustrates a correlation for the RS at the same location by adding the OCC to the same base sequence, and it may be verified that the value is 0.

On the other hand, when respective UEs use different sequences, it can be seen that cross-correlation performance deteriorates much in the same environment as that of FIG. 10.

That is, in FIG. 11, a cross-correlation mean value is 0.049943.

Table 4 is a table showing an example of parameters related to performance measurement of cross-correlation.

TABLE 4

| | |
|---|---|
| RS BW | 250 RBs |
| Wideband UE BW | 250 RBs |
| Narrow band UE BW | 50 RBs |
| Cell ID | 128 |
| OCC | valid |

Figure 12:
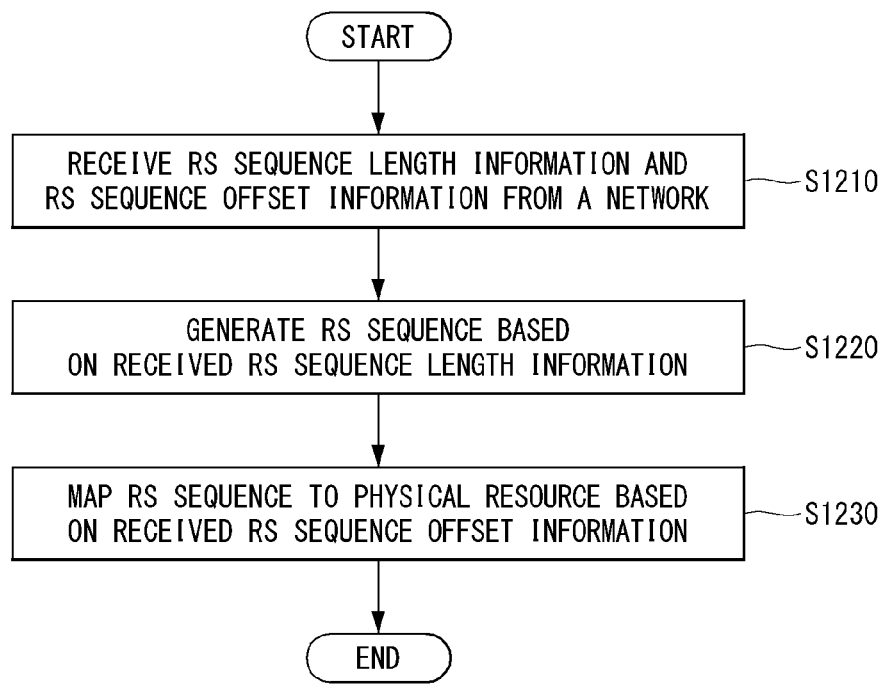
FIG. 12 is a flowchart showing an operating method of a terminal for mapping an RS sequence to a physical resource proposed in the present disclosure.

FIG. 12 is a flowchart showing an operating method of a UE for mapping an RS sequence to a physical resource proposed in the present disclosure.

Contents of FIG. 12 represent contents regarding the RS sequence mapping method from the viewpoint of the operation of the UE and the aforementioned contents are all applicable to contents to be described below and the specific description may refer to the aforementioned contents.

First, a UE receives, from a network (e.g., eNB), length information indicating a length of the RS sequence and offset information indicating a start position of the RS sequence mapped to the physical resource allocated to the UE (S1210).

Here, the length information may be transmitted through a common resource, a group common resource, or a UE-specific resource.

In addition, the physical resource allocated to the UE may be a bandwidth (BW) or a bandwidth part (BWP) or may be configured in units of RB.

In addition, the length of the RS sequence may be configured based on the bandwidth (BW) of at least one UE accessing the network and more specifically, may be configured based on a largest bandwidth or a smallest bandwidth among bandwidths of at least one UE accessing the network.

Thereafter, the UE generate the RS sequence based on the received length information (S1220).

The method of Equation 2 described above may be used for generation of the RS sequence.

Thereafter, the UE map the generated RS sequence to the physical resource based on the offset information (S1230).

Here, the generated RS sequence may be mapped to the physical resource from a position corresponding to a value indicated by the offset information.

In addition, as the specific method for mapping the RS sequence to the physical resource, the aforementioned methods may be used.

For example, when the length of the generated RS sequence is smaller than the size of the physical resource allocated to the UE, the generated RS sequence may be repeated at least once and mapped to the physical resource.

In this case, when the generated RS sequence is repeated at least once, different scramblings may be applied to RS sequences and the UE may receive, from the network, scrambling IDs for identifying the scramblings applied to the RS sequences, respectively.

As another example, when the length of the generated RS sequence is larger than the size of the physical resource allocated to the UE, only some of the generated RS sequences may be mapped to the physical resource.

Overview of Devices to which Present Disclosure is Applicable

Figure 13:
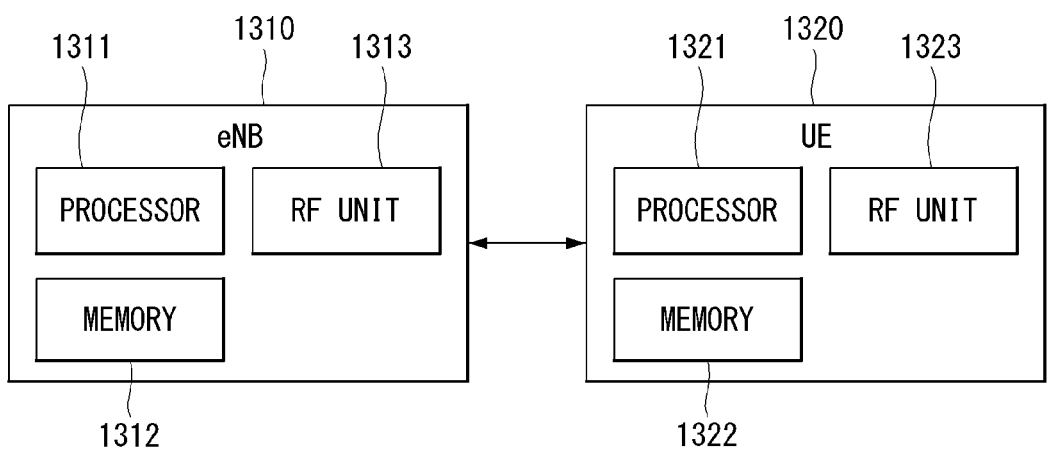
FIG. 13 illustrates a block diagram of a wireless communication device to which methods proposed in the present disclosure may be applied.

FIG. 13 illustrates a block diagram of a wireless communication device to which methods proposed in the present disclosure may be applied.

Referring to FIG. 13, a wireless communication system includes an eNB 1310 and multiple UEs 1320 positioned within an area of the eNB 1310.

Each of the eNB and the UE may be expressed as a wireless device.

The eNB 1310 includes a processor 1311, a memory 1312, and a radio frequency (RF) module 1313. The processor 1311 implements a function, a process, and/or a method which are proposed in FIGS. 1 to 12 above. Layers of a radio interface protocol may be implemented by the processor. The memory 1312 is connected with the processor to store various information for driving the processor. The RF module 1313 is connected with the processor to transmit and/or receive a radio signal.

The UE 1320 includes a processor 1321, a memory 1322, and an RF module 1323.

The processor 1321 implements a function, a process, and/or a method which are proposed in FIGS. 1 to 12 above. Layers of a radio interface protocol may be implemented by the processor. The memory 1322 is connected with the processor to store various information for driving the processor. The RF module 1323 is connected with the processor to transmit and/or receive a radio signal.

The memories 1312 and 1322 may be positioned inside or outside the processors 1311 and 1321 and connected with the processors 1311 and 1321 by various well-known means.

Further, the eNB 1310 and/or the UE 1320 may have a single antenna or multiple antennas.

Figure 14:
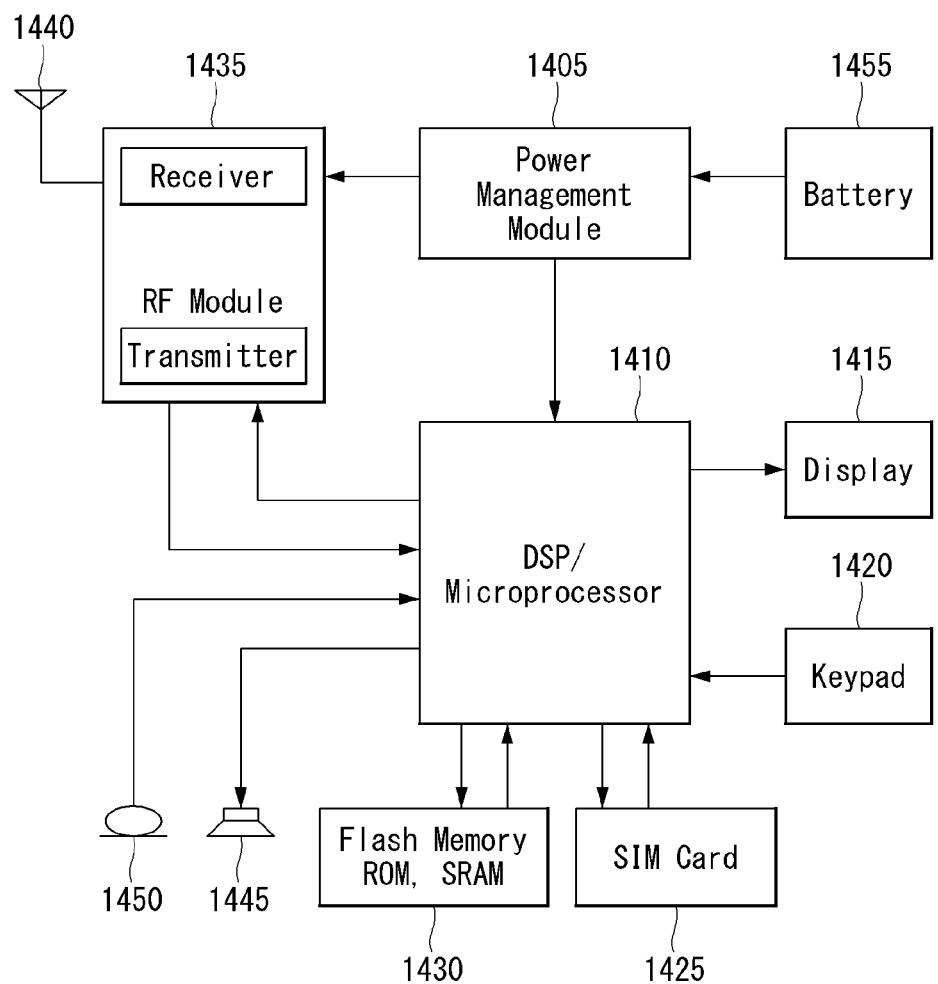
FIG. 14 illustrates a block diagram of a communication device according to an embodiment of the present disclosure.

FIG. 14 illustrates a block diagram of a communication device according to an embodiment of the present disclosure.

In particular, FIG. 14 is a diagram more specifically illustrating the UE of FIG. 13 above.

Referring to FIG. 14, the UE may be configured to include a processor (or a digital signal processor (DSP)) 1410, an RF module (or RF unit) 1435, a power management module 1405, an antenna 1440, a battery 1455, a display 1415, a keypad 1420, a memory 1430, a subscriber identification module (SIM) card 1425 (this component is optional), a speaker 1445, and a microphone 1450. The UE may also include a single antenna or multiple antennas.

The processor 1410 implements a function, a process, and/or a method which are proposed in FIGS. 1 to 12 above. The layers of the radio interface protocol may be implemented by the processor.

The memory 1430 is connected with the processor and stores information related with an operation of the processor. The memory 1430 may be positioned inside or outside the processor and connected with the processor by various well-known means.

A user inputs command information such as a telephone number or the like by, for example, pressing (or touching) a button on the keypad 1420 or by voice activation using the microphone 1450. The processor receives such command information and processes to perform appropriate functions including dialing a telephone number. Operational data during driving may be extracted from the SIM card 1425 or the memory 1430. In addition, the processor may display command information or drive information on the display 1415 for the user to recognize and for convenience.

The RF module 1435 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1440 functions to transmit and receive the wireless signals. Upon receiving the radio signals, the RF module may transfer the signal for processing by the processor and convert the signal to a baseband. The processed signal may be converted into to audible or readable information output via the speaker 1445.

Figure 15:
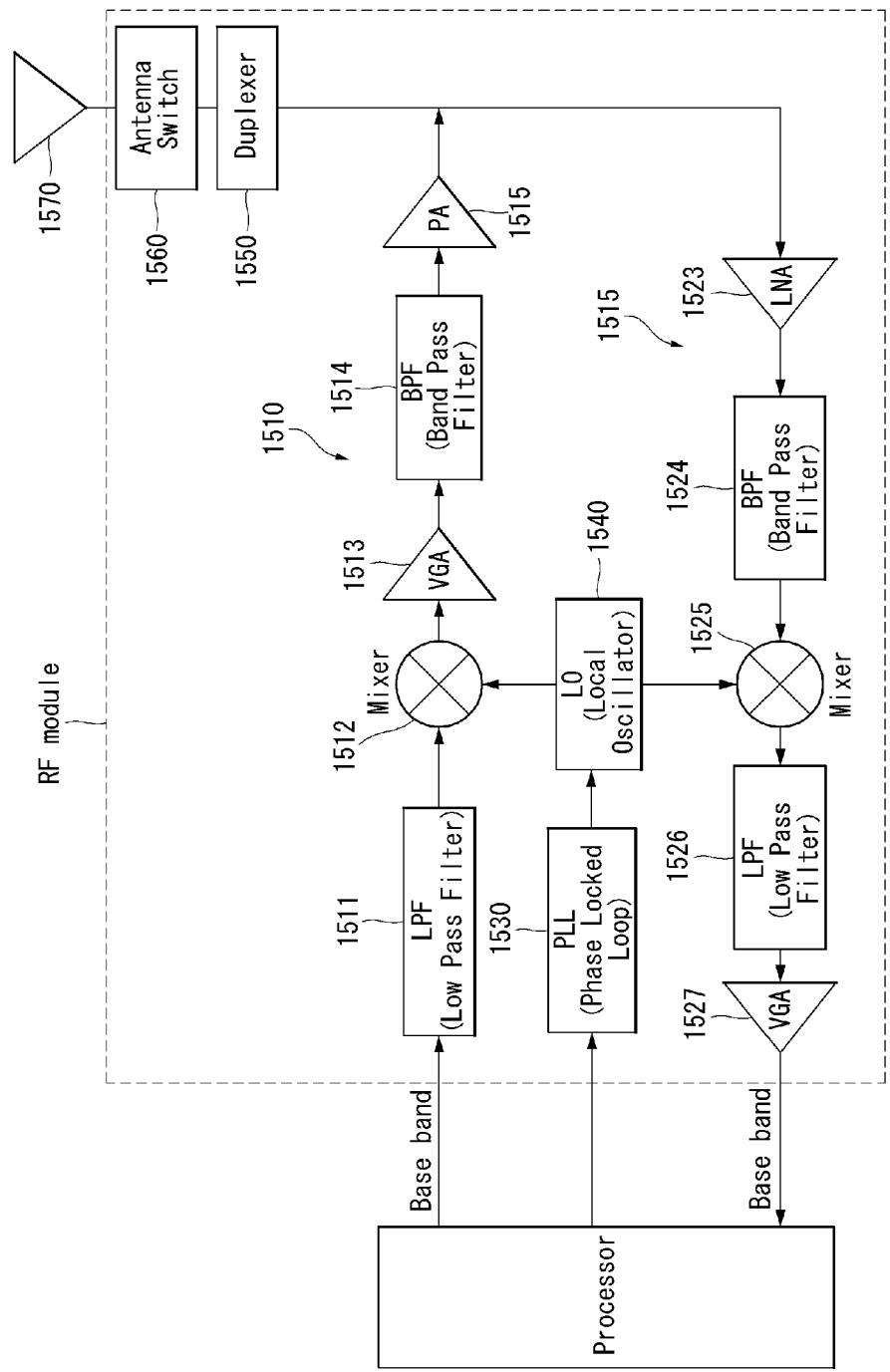
FIG. 15 is a diagram illustrating an example of an RF module of a wireless communication device to which the method proposed in the present disclosure may be applied.

FIG. 15 is a diagram illustrating an example of an RF module of a wireless communication device to which the method proposed in the present disclosure may be applied.

Specifically, FIG. 15 illustrates an example of an RF module that may be implemented in a frequency division duplex (FDD) system.

First, in a transmission path, the processors described in FIGS. 13 and 14 process the data to be transmitted and provide an analog output signal to the transmitter 1510.

Within the transmitter 1510, the analog output signal is filtered by a low pass filter (LPF) 1511 to remove images caused by a digital-to-analog conversion (ADC) and up-converted to an RF from a baseband by an up-converter (mixer) 1512, and amplified by a variable gain amplifier (VGA) 1513 and the amplified signal is filtered by a filter 1514, additionally amplified by a power amplifier (PA) 1515, routed through a duplexer(s) 1550/an antenna switch(es) 1560, and transmitted through an antenna 1570.

In addition, in a reception path, the antenna 1570 receives signals from the outside and provides the received signals, which are routed through the antenna switch(es) 1560/duplexers 1550 and provided to a receiver 1520.

In the receiver 1520, the received signals are amplified by a low noise amplifier (LNA) 1523, filtered by a band pass filter 1524, and down-converted from the RF to the baseband by a down-converter (mixer) 1525.

The down-converted signal is filtered by a low pass filter (LPF) 1526 and amplified by a VGA 1527 to obtain an analog input signal, which is provided to the processors described in FIGS. 12 and 13.

Further, a local oscillator (LO) generator 1540 also provides transmitted and received LO signals to the up-converter 1512 and the down-converter 1525, respectively.

In addition, a phase locked loop (PLL) 1530 receives control information from the processor to generate the transmitted and received LO signals at appropriate frequencies and provides control signals to the LO generator 1540.

Further, circuits illustrated in FIG. 15 may be arranged differently from the components illustrated in FIG. 15.

Figure 16:
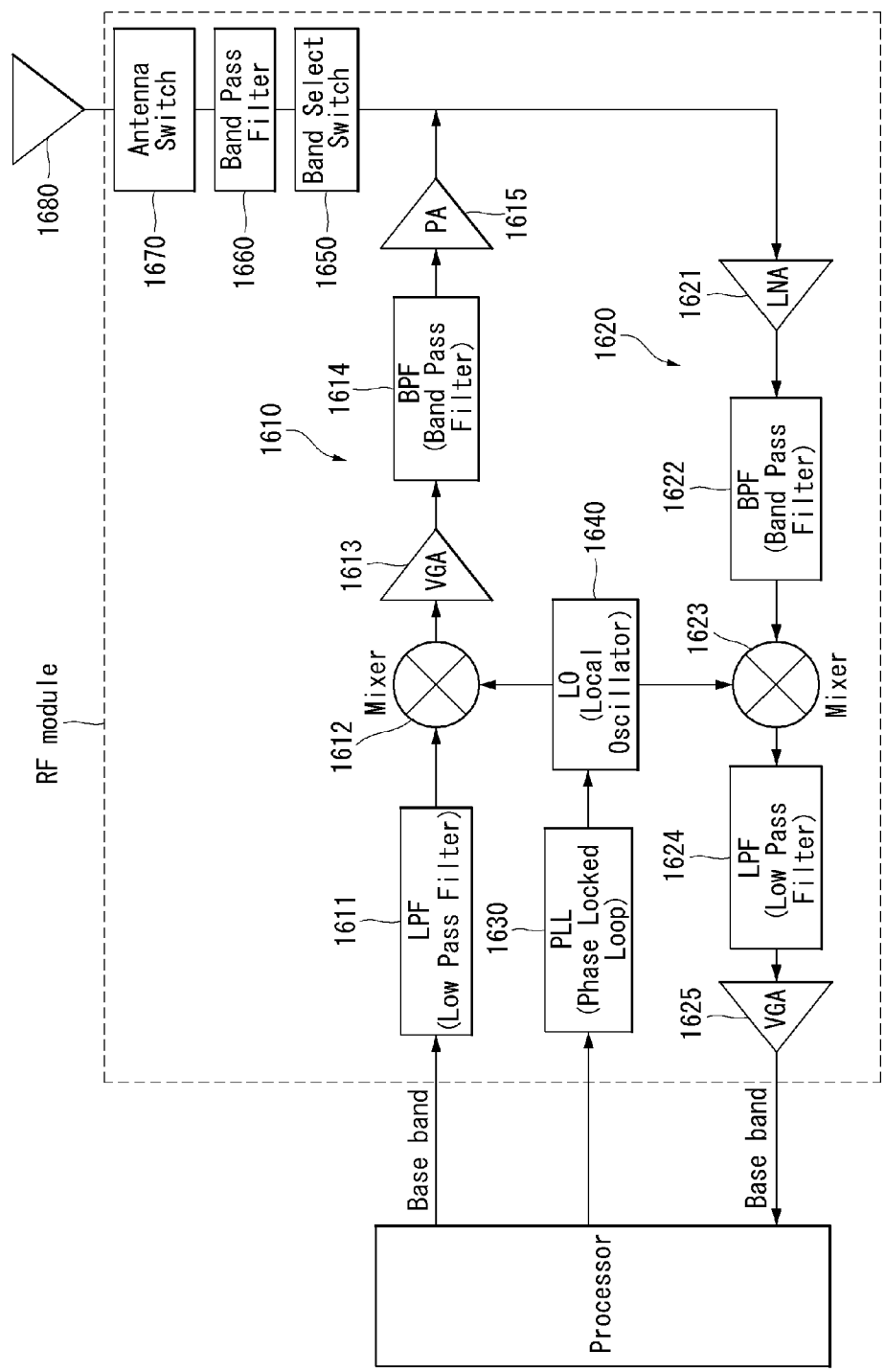
FIG. 16 is a diagram illustrating another example of an RF module of a wireless communication device to which a method proposed in the present disclosure may be applied.

FIG. 16 is a diagram illustrating another example of an RF module of a wireless communication device to which a method proposed in the present disclosure may be applied.

Specifically, FIG. 16 illustrates an example of an RF module that may be implemented in a time division duplex (TDD) system.

A transmitter 1610 and a receiver 1620 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 15.

A signal amplified by a power amplifier (PA) 1615 of the transmitter is routed through a band select switch 1650, a band pass filter (BPF) 1660, and an antenna switch(es) 1670 and transmitted via an antenna 1680.

In addition, in a reception path, the antenna 1680 receives signals from the outside and provides the received signals, which are routed through the antenna switch(es) 1670, the band pass filter 1660, and the band select switch 1650 and provided to the receiver 1620.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although a method for mapping a reference signal in a wireless communication system of the present disclosure has been described with reference to an example applied to a 3GPP LTE/LTE-A system or a 5G system (new RAT system), the method may be applied to various wireless communication systems in addition to the 3GPP LTE/LTE-A system or 5G system.

What is claimed is:

1. A method for mapping a reference signal (RS) sequence to a physical resource in a wireless communication system, the method performed by a terminal, comprising:
   receiving, from a network, length information indicating a length of the RS sequence and offset information indicating a start position of the RS sequence mapped to the physical resource allocated to the terminal;
   generating the RS sequence based on the received length information; and
   mapping the generated RS sequence to the physical resource based on the offset information,
   wherein the generated RS sequence is mapped to the physical resource from a position corresponding to a value indicated by the offset information, and
   wherein when the length of the generated RS sequence is smaller than the size of the physical resource allocated to the terminal, the generated RS sequence is repeated at least once and mapped to the physical resource.

2. The method of claim 1, wherein the length information is transmitted through a common resource or a common group resource.

3. The method of claim 1, wherein the physical resource allocated to the terminal is a bandwidth (BW) or a bandwidth part (BWP).

4. The method of claim 1, wherein when the generated RS sequence is repeated at least once, different scramblings are applied among the RS sequences.

5. The method of claim 4, further comprising:
   receiving, from the network, a scrambling identifier (ID) for identifying the scramblings applied to the RS sequences, respectively.

6. The method of claim 1, wherein when the length of the generated RS sequence is larger than the size of the physical resource allocated to the terminal, only some of the generated RS sequences are mapped to the physical resource.

7. The method of claim 1, wherein the length of the RS sequence is configured based on the bandwidth (BW) of at least one terminal connected to the network.

8. The method of claim 7, wherein the length of the RS sequence is configured based on a largest bandwidth or a smallest bandwidth in the bandwidth of at least one terminal connected to the network.

9. A terminal for mapping a reference signal (RS) sequence to a physical resource in a wireless communication system, the terminal comprising:
   a radio frequency (RF) module transmitting and receiving a radio signal; and a processor functionally connected with the RF module,
wherein the processor is configured to
receive, from a network, length information indicating a length of the RS sequence and offset information indicating a start position of the RS sequence mapped to the physical resource allocated to the terminal,
generate the RS sequence based on the received length information, and
map the generated RS sequence to the physical resource based on the offset information, and
wherein the generated RS sequence is mapped to the physical resource from a position corresponding to a value indicated by the offset information, and
wherein when the length of the generated RS sequence is smaller than the size of the physical resource allocated to the terminal, the generated RS sequence is repeated at least once and mapped to the physical resource.

* * * * *